United States Patent Office 3,699,076

Patented Oct. 17, 1972

1

3,699,076

COLORED CYANOACRYLATE ADHESIVE COMPOSITIONS

William F. Thomsen and Paul T. Von Bramer, Kingsport, Tenn., assignors to Eastman Kodak Company, Rochester, N.Y.

No Drawing. Continuation of abandoned application Ser. No. 696,686, Jan. 10, 1968. This application Nov. 25 1970, Ser. No. 92,858

Int. Cl. C08f *1/84, 45/04*

U.S. Cl. 260—41 C 14 Claims

ABSTRACT OF THE DISCLOSURE

Autopolymerizable alpha-cyanoacrylate adhesive compositions having incorporated therein disperse dyes of the anthraquinone class which have an amino group and either an aryl group on the amino group, or a phenolic type OH group on the anthraquinone ring.

This application is a streamlined continuation of copending Ser. No. 696,686, filed Jan. 10, 1968 now abandoned.

This invention relates to new autopolymerizable alpha-cyanoacrylate adhesive compositions. More particularly, this invention relates to autopolymerizable alpha-cyanoacrylate adhesive compositions which are readily visible to the human eye when the compositions are spread in thin films and are still in monomeric form.

Autopolymerizable adhesive compositions comprising one or more monomeric esters of alpha-cyanoacrylic acid are known in the art and are recognized to have great utility in bonding a wide variety of like and different substrates. However, one drawback has been that the use of an excessive amount of the monomers tended to slow down the polymerization of the monomers in that large drops or relatively thick liquid films of the monomers did not polymerize as rapidly as desired. Further, as certain of the monomeric adhesive compositions began to be used as a surgical adhesive, it became very important to use the minimum thicknesses of the monomers to obtain strong thin bonds.

The monomeric adhesives are essentially clear and when spread in thin films, especially on bloody living tissue, the films are almost impossible to see. It, therefore, is extremely difficult to judge just how much of the monomeric adhesive composition has been placed on the tissue. Also, while it is known that the alpha-cyanoacrylates are bio-degradable in varying degrees, it is important that no stray and unwanted drops of the adhesive be left within the body of the patient as a result of surgical procedures.

In general, the sensitivity of the alpha-cyanoacrylate monomers to polymerization has precluded the use of coloring materials therein. Certain functional groups present in the chemical makeup of the dye, we believe tend to cause the premature polymerization of the adhesive composition. Other dyes and pigments are so insoluble in the alpha-cyanoacrylate monomers that they impart only a tint and when the adhesive is spread in a thin film (i.e., 1 mil) the color is not readily visible.

The mechanism by which the alpha-cyanoacrylates polymerize has been reported by Drs. Coover, Shearer, Joyner and Wicker in the Society of Plastics Engineers Journal, 15, No. 5, 1959. As reported, negatively disubstituted ethylenes of the type represented by Formula 1 polymerize by a base-catalyzed ionic mechanism; for example, the alkyl 2-cyanoacrylates readily undergo a highly exothermic polymerization which may be initiated at low temperatures by even very weak bases such as

2 water and alcohols. This polymerization reaction is represented by the following equations in which the basic catalyst is represented by $A^-$, an electron donor:

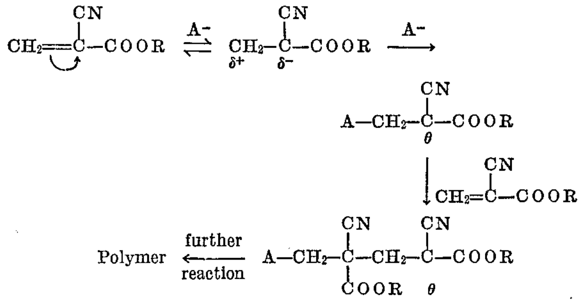

(Formula 1)

The bonding action observed when a 2-cyanoacrylate is placed between two adherends is the result of this anionic polymerization. This polymerization is apparently catalyzed by minute amounts, of water or other weak bases present on the adherend surfaces. Their effect on the bonding action is maximized by spreading the adhesive monomer into a very thin film. Acidic substances exert an inhibitory effect on the polymerization and thus can be used as stabilizers.

All such negatively disubstituted ethylenes do not possess the phenomenal activity associated with the alkyl 2-cyanoacrylates. Monomers possessing electronegative groups which function primarily through a strong inductive (—I) effect do not possess the sensitivity of the 2-cyanoacrylates toward weak bases; for example, 2-(trifluoromethyl) acrylonitrile and methyl 2-(trifluoromethyl) acrylate are not polymerized by weak bases such as water or alcohols, although the trifluoromethyl group is strongly electronegative.

The sensitivity of the alkyl 2-cyanoacrylates to weak bases, which effectively catalyze the polymerization of these monomers, is probably due to the strong electromeric (—E) effects of both the nitrile group and the alkoxycarbonyl group. Under the influence of the catalyst, the strong —E effects which are brought into play render these groups strongly electronegative. When the —E effects of groups of this type are strong and are operating, the electronegativity generally overshadows that of any group operating only through a strong —I effect. Thus, the combined —E effect of the nitrile group and the alkoxycarbonyl group, stimulated by even very weak bases, is apparently sufficient to cause an unusually strong polarization of the double bond in the alkyl 2-cyanoacrylates:

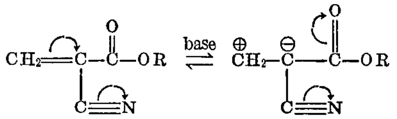

We have found that particular coloring materials can be made a part of alpha-cyanoacrylate compositions and that these particular coloring materials will not cause premature polymerization of the adhesive compositions. Further, these coloring materials are sufficiently soluble in the monomers to impart thereto color which in a film or 1 mil thickness is readily visible to the human eye. These novel compositions are characterized in having a bulk liquid storage stability sufficient to withstand a temperature of at least 110° C. for about 30 minutes, with a resulting change in viscosity of less than about 50%, and having sufficient activity when spread in a thin film on a neutral surface at normal atmospheric conditions to form a strong bond in less than about 30 seconds.

The alpha-cyanoacrylate monomers useful in our invention include cyanoacrylate esters of the formula:

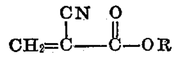

wherein R is a radical of 1 to 16 carbon atoms from the group of alkyl, alkoxyalkyl, alkenyl, cyclohexyl and phenyl.

The monomers can be prepared in any desired manner. A particularly suitable process for the preparation of the monomers is described in U.S. Pat. 3,254,111 of Hawkins and McCurry. Any of the alpha-cyanoacrylate monomers as defined herein can be used alone or in mixtures of two or more of such monomers in practicing the invention. Also polymeric thickeners such as poly (alphacyanoacrylates), cellulose acetate, cellulose nitrate, cellulose butyrate, cellulose propionate, polymethacrylates and other polymeric materials which are soluble in monomeric alpha-cyanoacrylates can be employed as viscosity regulators.

Polymerization inhibitors such as sulfur dioxide, boron trifluoride, hydrogen fluoride, nitric oxide, phosphorus pentoxide, antimony pentoxide, picric acid, hydroquinone and the like can be used in our novel compositions.

Also plasticizers such as, for example, dioctyl phthalate, butylcycanoacetate, dimethyl succinate, dimethyl sebacate and dioctyl adipate can be used, if desired, to impart desired characteristics to the adhesive bond.

The coloring compounds comprising a part of our novel colored autopolymerizable adhesive compositions are characterized by being sufficiently soluble in the alpha-cyanoacrylate monomers to impart thereto color which in a film of about one mil thickness is readily visible to the human eye, the coloring material is further characterized in that it is sufficiently non-basic so as not to initiate polymerization of the monomer. The colored adhesive compositions of this invention are characterized in having bulk liquid storage stability sufficient to withstand a temperature of at least 110° C. for about thirty minutes with a resulting viscosity change of less than about fifty percent, and having sufficient activity when spread in a thin film on a neutral surface at normal atmospheric conditions to form a strong adhesive bond in less than about thirty seconds.

The adhesive compositions of this invention when used in surgical procedures, must have sufficient stability to be sterilized by heat of at least 110° C. for about thirty minutes with a viscosity change of less than about fifty percent. This necessity of being stable under sterilization conditions rules out the use of many otherwise suitable dyes or coloring materials because many such materials would catalyze polymerization of the monomer even at room temperature. Other coloring materials will not impart to the monomers sufficient color intensity to render thin films of the monomer readily visible to the human eye.

We obtain particularly good results in accordance with our invention when we add to the alpha-cyanoacrylate adhesive compositions disperse dyes of the anthraquinone class which have an amino group and either an aryl group on the amino group, or a phenolic type OH group on the anthraquinone ring. We believe that these function to offset the basicity of the amino group and thereby prevent premature polymerization of the monomers.

One coloring material which gives especially good results in accordance with our invention is 1-hydroxy-4-p-toluidino anthraquinone having the structure:

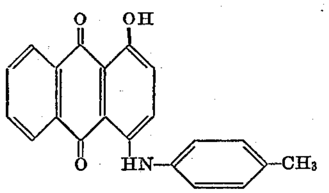

The compositions of our invention having this coloring material incorporated therein possess a deep violet shade. The color is intense enough to be seen in films of the monomer which are about one mil thick. Further this particular coloring material does not adversely affect the stability of the alpha-cyanoacrylate monomers.

Another coloring material which gives especially good results is 1,4-bis(2,6-diethylanilino) anthraquinone having this structure:

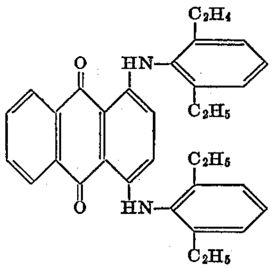

This compound gives a deep blue shade to the alpha-cyanoacrylate monomers. The color is intense enough to be seen in films of the monomer which are about one mil thick. Further, this particular compound does not cause premature polymerization of the monomers.

Other coloring materials which we have found to be useful in the compositions of the invention are:

1,4 - [3-(cyclohexylamino)sulfonyl]-2,4,6-trimethylaniing the structure:

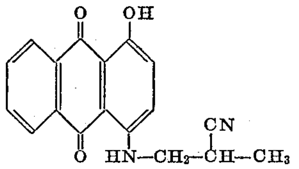

1,4 - [3-(cyclohexylamino)sulfonyl] - 2,4,6-trimethylanilino] anthraquinone having the structure:

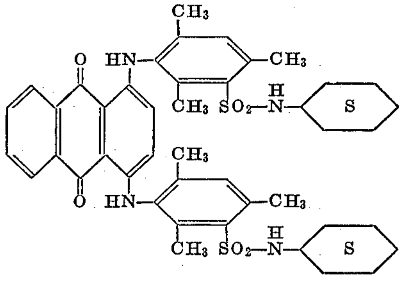

4 - [(tetrahydro-1,1-dioxo-3-thienyl)amino]-1-hydroxyanthraquinone having the structure:

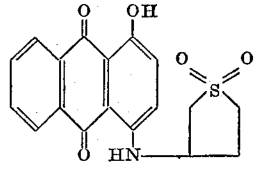

5-amino-4-anilino-1,8-dihydroxy-anthraquinone having the structure:

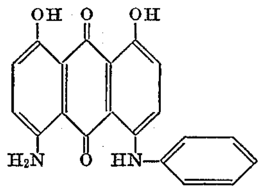

4-anilino-1-hydroxyanthraquinone having the structure:

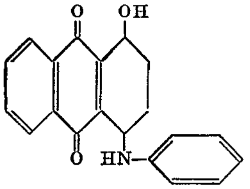

4-p-anisidino-1-hydroxyanthraquinone having the structure:

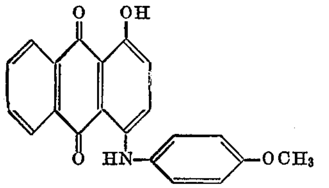

1,4-di-p-toluidinoanthraquinone having the structure:

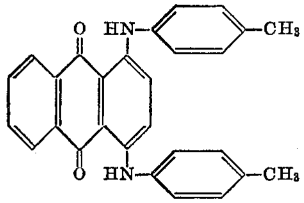

4-hydroxy-2-phenoxy-1-aminoanthraquinone having the structure:

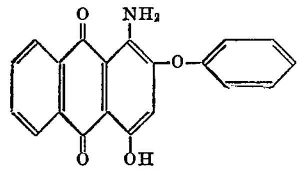

1,2,3,4,4a,14a-hexahydro - 14H - naphtho[2,3-a]phenothiazine-8,13-dione having the structure:

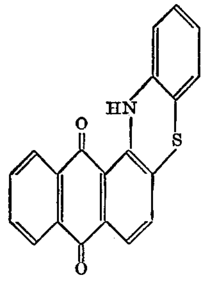

The following examples will serve further to illustrate the manner whereby we practice our invention:

EXAMPLE 1

Twenty grams of methyl 2-cyanoacrylate adhesive and 0.20 gram of 1,4-bis(2,6-diethylanilino) anthraquinone were placed in a one-ounce polyethylene bottle and shaken until all of the anthraquinone dye was dissolved. The adhesive remained stable for over two months at room temperature (75° F.). The shear strength values of this adhesive on steel substrate specimens with and without the anthraquinone dye present are as follows:

| | Shear strength values (p.s.i.), cure time | | |
|---|---|---|---|
| | 2 min. | 15 min. | 24 hrs. |
| Methyl 2-cyanoacrylate (without dye) | 2,040 | 1,880 | 2,913 |
| Methyl 2-cyanoacrylate (with 1% anthraquinone dye) | 1,887 | 1,613 | 3,040 |

EXAMPLE 2

One gram of methyl 2-cyanoacrylate adhesive containing the anthraquinone dye, as prepared in Example 1, was placed in a tin metal tube and sealed. The tube was placed in an oven at 125° C. for 1 hour. After allowing the tube to cool, the adhesive showed no visible change in viscosity. Two months after this one hour heating the adhesive continues to remain stable as there is no visible change in viscosity.

EXAMPLE 3

One gram of 4-anilino-1-hydroxyanthraquinone was added to 19 grams of n-butyl 2-cyanoacrylate contained in a one-ounce polyethylene bottle. The cyanoacrylate was shaken until the anthraquinone dye had dissolved. The intensely colored cyanoacrylate adhesive remained stable for over two months at room temperature and remained stable after being subjected to a heat of 142–143° C. for one hour for sterilization.

EXAMPLE 4

One drop of the above colored n-butyl 2-cyanoacrylate was placed on a glass microscope slide. Another glass slide was used to press the drop into the thin film. A film thickness of approximately one mil was sufficiently colored to be readily visible.

EXAMPLE 5

One gram of 1,4-bis[3-[(cyclohexylamino) sulfonyl] 2,4,6-trimethyl-anilino] anthraquinone was dissolved in 19 grams of methyl 2-cyanoacrylate by shaking in a one-ounce polyethylene bottle. The intensely blue colored methyl cyanoacrylate remained stable for more than two months at room temperature (75° F.). A drop of the adhesive containing the dye was placed between two glass microscope slides to form a film thickness of approximately one mil. The colored film is readily visible.

EXAMPLE 6

Approximately 0.2 gram of 4-[(2-cyanopropyl)amino]-1-hydroxyanthraquinone is dissolved in 19.8 grams of methyl 2-cyanoacrylate by shaking in a one-ounce polyethylene bottle. The dye gives an intensely blue color to the cyanoacrylate adhesive. The adhesive is stable at room temperature. One drop of the colored cyanoacrylate adhesive when placed between microscope slides results in polymerized film approximately one mil thick that is readily visible due to the presence of the dye.

EXAMPLE 7

Approximately 0.2 gram of 4-[(tetrahydro-1,1-dioxo-3-thienyl)amino]-1-hydroxyanthraquinone is added to 19.8 grams of methyl 2-cyanoacrylate and the mixture is shaken until all the dye is dissolved. The cyanoacrylate is intensely colored and is stable. A drop of the colored cyanoacrylate placed between two glass slides produces a bond therebetween that is approximately one mil thick and is readily visible.

EXAMPLE 8

Approximately 0.2 gram of 4-p-anisidino-1-hydroxyanthraquinone is dissolved in 19.8 grams of n-butyl 2-cyanoacrylate adhesive by shaking for several minutes to give the cyanoacrylate an intense purple color. The cyanoacrylate adhesive forms a readily visible film of adhesive when spread between glass slides to a film approximately one mil thick. The colored cyanoacrylate will remain stable for more than five months.

EXAMPLE 9

A green colored adhesive is prepared by dissolving 0.2 gram of 1,4-di-p-toluidinoanthraquinone in 19.8 grams of methyl 2-cyanoacrylate adhesive. The adhesive is a dark green color and gives a light but readily visible film when spread out to a thickness of one mil. The adhesive remains stable under sterilization conditions of 125° C. for one hour.

EXAMPLE 10

One gram of 1-hydroxy-4-p-toluidinoanthraquinone was dissolved in 19 grams of n-butyl 2-cyanoacrylate adhesive. The intensely purple colored cyanoacrylate adhesive remained stable after storage for several months. The adhesive gives a readily visible film when spread out to a one mil. thickness.

EXAMPLE 11

Shear strength data of the bonds prepared from the colored cyanoacrylate as given in Example 10 was determined by placing one drop, approximately 0.006 gram on a cold roll steel specimen (2.0" x 0.5" x 0.066") with an overlap joint of 0.5 inch and allowed to cure overnight. The average shear strength from three specimens is given as follows:

| Adhesive: | Average shear strength (p.s.i.) |
|---|---|
| n-Butyl 2-cyanoacrylate (without dye) | 1620 |
| n-Butyl 2-cyanoacrylate (with 5% of 1-hydroxy-4-p-toluidinoanthraquinone) | 1700 |

EXAMPLE 12

Approximately 0.2 gram of 1-hydroxy-4-p-toluidinoanthraquinone was dissolved in 19.8 grams of methyl 2-cyanoacrylate. The methyl 2-cyanoacrylate is colored an intense purple and is stable at room temperature. The adhesive remained stable under sterilization conditions of 125° C. for one hour. The colored adhesive was readily visible when spread into a film of one mil thickness.

EXAMPLE 13

The bond strength of the methyl 2-cyanoacrylate with and without the 1-hydroxy-4-p-toluidinoanthraquinone dye as given in Example 12 is as follows:

| Adhesive: | Average shear strength (p.s.i.) |
|---|---|
| Methyl 2-cyanoacrylate (without a dye) | 1890 |
| Methyl 2-cyanoacrylate (with 1% of 1-hydroxy-4-p-toluidinoanthraquinone) | 1620 |

EXAMPLE 14

Approximately 0.2 gram of 4 - hydroxy-2-phenoxy-1-aminoanthraquinone is dissolved in 19.8 grams of methyl 2-cyanoacrylate by shaking the mixture for several minutes. The colored cyanoacrylate remains stable at room temperature and is readily visible in a film that is only one mil thick.

EXAMPLE 15

Approximately 0.2 gram of 1,2,3,4,4a,14a-hexahydro-14H-naphtho[2,3a] phenothiazine-8,13-dione is dissolved in 19.8 grams of n-butyl 2-cyanoacrylate. The resulting colored cyanoacrylate remains stable at room temperature and is readily visible when spread into a film one mil thick.

EXAMPLE 16

Approximately 0.2 gram of 5-amino-4-anilino-1,8-dihydroxyanthraquinone was dissolved in 19.8 grams of methyl 2-cyanoacrylate. The resulting intensely blue colored cyanoacrylate remained stable for more than six months. The cyanoacrylate containing this concentration of dye is readily visible when spread to a film that is less than one mil thick.

Set forth in Table I below are examples of coloring materials which are similar in structure to the coloring materials set forth in Examples 1–16. However, we have found that when these particular coloring materials are placed in alpha-cyanoacrylate monomers such as methyl 2-cyanoacrylate and n-butyl 2-cyanoacrylate in amounts up to about five percent by weight they cause the monomers to polymerize in bulk. Additionally, some of them are not readily visible in a film of the monomers which is one mil in thickness.

| Coloring material | Visible film (1 mil thick) | Stable after being heated to 110° C. for 30 mins. |
|---|---|---|
| 1,4-bis[(2-hydroxyethyl)amino]-5,8 dihydroxyanthraquinone. | Yes | No. |
| 1-amino-4-anilinoanthraquinone | Yes | No. |
| 1-amino-4-(p-butylanilino)-2-(sodisulfo) anthraquinone. | No | No. |
| 1,4,5,8-tetraamino anthraquinone | Yes | No. |
| 1,4-bis(isopropylamino)anthraquinone | No | No. |
| 4-[p-(2-hydroxyethoxy)anilino]1-(methylamino)anthraquinone. | Yes | No. |
| Methyl 3-[4-[bis(2-acetoxyethyl) amino]-O-tolyl]-2-cyanoacrylate. | Yes | No. |
| 4-ethoxy-2-nitro-4-sulfamoyl diphenylamine | No | No. |
| 3-[N-ethyl-4-[(5-nitro-2-thiazolyl) azo]-m-toluidino]-1,2-propanediol. | No | No. |
| N,N-diethyl-4-[4-(o-tolylazo)-o-tolylazo]-m-toluidine. | No | No. |
| Dibromo-1,4-naphthroquinone imine | Yes | No. |
| 2-[[p-(dimethylamino)phenyl]azo]-6-methoxy-3-methylbenzothiazolium iodide. | No | No. |
| 3,4-dihydro-4-hydroxyl-1-methyl-3-[(p-nitrophenyl)azo] carbostyril nickel chelate. | No | No. |
| 8,18-dichloro-5,15-diethyl-carbazolo [3',2':5,6] [1,4] oxazino [2,3,b] indolo [2,3,-i,phenoxazine. | No | No. |
| Disodium 3.3'-dioxo-[2,2'-biindoline]5,5'-disulfonate. | No | No. |

Although the invention has been described in considerable detail with particular reference to certain preferred embodiments thereof, variations and modifications can be effected within the spirit and scope of the invention as described hereinabove, and as defined in the appended claims.

We claim:

1. A stable adhesive composition which is autopolymerizable when spread in thin films comprising a monomeric α-cyanoacrylate ester of the formula

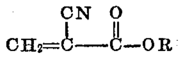

wherein R is a radical of 1 to 16 carbon atoms from the group consisting of alkyl, alkoxyalkyl, alkenyl, cyclohexyl and phenyl, said composition containing up to about 5% of a coloring material which is a disperse dye of the anthraquinone class containing an amino group attached to a carbon atom of the anthraquinone nucleus and further having (1) an aryl group attached to the amino group,
(2) an OH group on the anthraquinone ring, or
(3) a combination of said (1) and (2), said coloring material being characterized by sufficient solubility in said monomers to impart thereto color which is readily visible to the human eye in a film of 1 mil thickness, said coloring material being further characterized in that it is sufficiently nonbasic so as not to initiate polymerization of the monomers, the adhesive composition being characterized in having bulk liquid storage stability sufficient to withstand a temperature of at least 110° C. for about 30 minutes with a resulting viscosity change of less than about 50%, and having sufficient activity when spread in a thin film on a neutral, surface at normal atmospheric conditions to form a strong bond in less than about 30 seconds.

2. A stable adhesive composition which is autopolymerizable when spread in thin films comprising a monomeric α-cyanoacrylate ester of the formula:

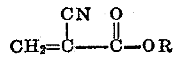

wherein R is a radical of 1 to 16 carbon atoms from the group consisting of alkyl, alkoxyalkyl, alkenyl, cyclohexyl and phenyl, said composition containing up to about 5% of a coloring material selected from
1-hydroxy-4-p-toluidinoanthraquinone;
1,4-bis(2,6-diethylanilino)anthraquinone;
1,4-bis[3-[(cyclohexylamino)sulfonyl]-2,4,6-trimethylanilino]anthraquinone;

4-[(2-cyanopropyl)amino]-1-hydroxyanthraquinone;
4-[(tetrahydro-1,1-dioxo-3-thienyl)amino-1-hydroxyanthraquinone;
5-amino-4-anilino-1,8-dihydroxyanthraquinone;
4-anilino-1-hydroxyanthraquinone;
4-p-anisidino-1-hydroxyanthraquinone;
1,4-di-p-toluidinoanthraquinone;
4-hydroxy-2-phenoxy-1-aminoanthraquinone; or
1,2,3,4a,14a - hexahydro - 14H - naphtho[2,3-a]phenothiazine-8,13-dione.

3. Adhesive composition of claim 2 wherein said coloring material is 1 - hydroxy - 4-p-toluidinoanthraquinone.

4. Adhesive composition of claim 2 wherein said coloring material is 1,4 - bis(2,6 - diethylanilino)anthraquinone.

5. Adhesive composition of claim 2 wherein said coloring material is 1,4 - bis[3-[(cyclohexylamino)sulfonyl]2,4,6-trimethylanilino]anthraquinone.

6. Adhesive composition of claim 2 wherein said coloring material is 4-[(2-cyanopropyl)amino]-1-hydroxyanthraquinone.

7. Adhesive composition of claim 2 wherein said coloring material is 4 - [(tetrahydro - 1,1 - dioxo-3-thienyl)amino]-1-hydroxyanthraquinone.

8. Adhesive composition of claim 2 wherein said coloring material is 5 - amino - 4 - anilino - 1,8 - dihydroxy-anthraquinone.

9. Adhesive composition of claim 2 wherein said coloring material is 4-anilino-1-hydroxyanthraquinone.

10. Adhesive composition of claim 2 wherein said coloring material is 4 - p-anisidino-1-hydroxyanthraquinone.

11. Adhesive composition of claim 2 wherein said coloring material is 1,4-di-p-toluidinoanthraquinone.

12. Adhesive composition of claim 2 wherein said coloring material is 4 - hydroxy - 2 - phenoxy-1-aminoanthraquinone.

13. Adhesive composition of claim 2 wherein said coloring material is 1,2,3,4,4a,14a - hexahydro - 14H-naphtho[2,3-a]phenothiazine-8,13-dione.

14. A stable adhesive composition which is autopolymerizable when spread in thin films comprising a monomeric α-cyanoacrylate ester of the formula

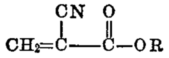

wherein R is a radical of 1 to 16 carbon atoms from the group consisting of alkyl, alkoxyalkyl, alkenyl, cyclohexyl and phenyl, said composition containing up to about 5% of a coloring material which is a disperse dye of the anthraquinone class containing an amino group attached to a carbon atom of the anthraquinone nucleus and further having (1) an aryl group attached to the amino group,
(2) an OH group on the anthraquinone ring, or
(3) a combination of said (1) and (2), said coloring material being characterized by imparting color which is readily visible to the human eye in a film which is 1 mil thick.

References Cited

UNITED STATES PATENTS

| | | | |
|---|---|---|---|
| 3,388,094 | 6/1968 | Dien | 260—41 C |
| 2,784,127 | 3/1957 | Joyner et al. | 260—30.6 |

MORRIS LIEBMAN, Primary Examiner

S. R. FOX, Assistant Examiner

U.S. Cl. X.R.

128—155; 424—81

UNITED STATES PATENT OFFICE

CERTIFICATE OF CORRECTION

Patent No. 3,699,076 Dated October 17, 1972

Inventor(s) William F. Thomsen, et. al.

It is certified that error appears in the above-identified patent and that said Letters Patent are hereby corrected as shown below:

Column 2, line 64, delete "or" and insert ---of---.

Column 4, lines 10-21 delete formula and insert

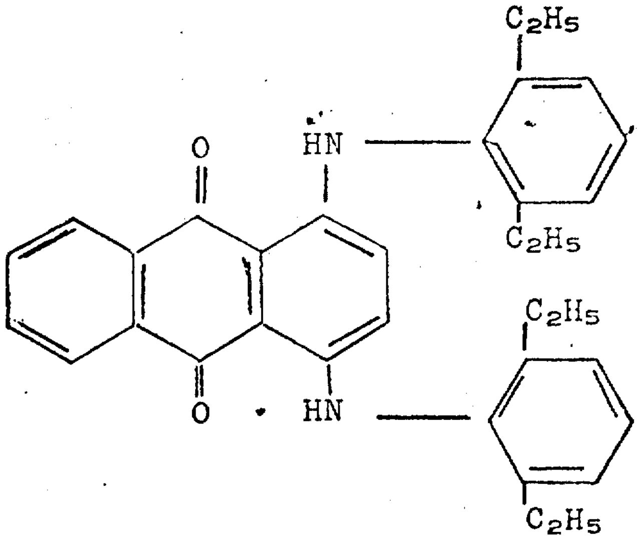

Column 4, line 27, delete "materials" and insert ---material---.

Column 4, lines 30 and 31 delete "1,4-[3-(cyclohexylamino)sulfonyl]-2,4,6-trimethylaniling the structure:" and insert ---4-[(2-cyanopropyl)-amino]-hydroxyanthraquinone having the structure:---

Column 4, lines 40 and 41, delete "1,4-[3-(cyclohexylamino)sulfonyl]-2,4,6-trimethylanilino] anthraquinone having the structure:" and insert ---1,4-bis[3-(cyclohexylamino)sulfonyl]2,4,6-trimethylanilino] anthraquinone having the structure:---

Column 5, lines 43-55, delete the formula and insert

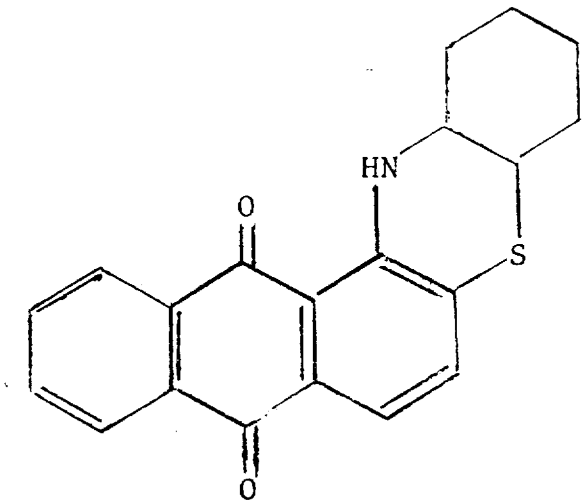

This certificate supersedes Certificate of Correction Issued June 5, 1973.

Signed and sealed this 13th day of November 1973.

(SEAL)
Attest:

EDWARD M.FLETCHER,JR.
Attesting Officer

RENE D. TEGTMEYER
Acting Commissioner of Patents